(12) United States Patent
Sarashiya et al.

(10) Patent No.: US 12,452,827 B2
(45) Date of Patent: Oct. 21, 2025

(54) LEARNING APPARATUS, DETERMINATION SYSTEM, LEARNING METHOD, AND NON-TRANSITORY COMPUTER READABLE MEDIUM

(71) Applicant: NEC Corporation, Tokyo (JP)

(72) Inventors: Koichi Sarashiya, Tokyo (JP); Wataru Ebihara, Tokyo (JP); Motoyasu Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 398 days.

(21) Appl. No.: 17/912,101

(22) PCT Filed: Mar. 11, 2021

(86) PCT No.: PCT/JP2021/009706
§ 371 (c)(1),
(2) Date: Sep. 16, 2022

(87) PCT Pub. No.: WO2021/200006
PCT Pub. Date: Oct. 7, 2021

(65) Prior Publication Data
US 2023/0164740 A1 May 25, 2023

(30) Foreign Application Priority Data
Mar. 31, 2020 (JP) ................................ 2020-063874

(51) Int. Cl.
*H04W 64/00* (2009.01)
*H04W 8/08* (2009.01)
(52) U.S. Cl.
CPC ........... *H04W 64/006* (2013.01); *H04W 8/08* (2013.01)
(58) Field of Classification Search
CPC ..... H04W 12/06; H04W 4/029; H04W 12/12; H04W 12/63; H04W 88/02
See application file for complete search history.

(56) References Cited

U.S. PATENT DOCUMENTS 10,275,671 B1 * 4/2019 Newman ................. G10L 17/02
2003/0139182 A1 * 7/2003 Bakkeby ................. H04W 8/06
455/432.1

(Continued)

FOREIGN PATENT DOCUMENTS

| JP | H07-046661 A | 2/1995 |
| JP | 2006-042023 A | 2/2006 |
| JP | 2008-301435 A | 12/2008 |

OTHER PUBLICATIONS

International Search Report for PCT Application No. PCT/JP2021/009706, mailed on Jun. 8, 2021.

*Primary Examiner* — Kwasi Karikari
(74) *Attorney, Agent, or Firm* — Sughrue Mion, PLLC

(57) ABSTRACT

A learning apparatus according to the present disclosure includes collection means for acquiring, from a collection apparatus configured to collect requests for updating position information of user terminals, a plurality of reception signal data pieces including transmission source countries and reception times of the collected requests for updating the position information. The learning apparatus further includes generation means for generating, for each of the user terminals, user data including a movement history between two countries in one direction and a movement time between the two countries in the one direction based on the acquired plurality of reception signal data pieces. The learning apparatus further includes learning means for learning a statistical value of the movement time between the two countries in the one direction based on the generated user data for each of the user terminals.

12 Claims, 13 Drawing Sheets

(56) References Cited

U.S. PATENT DOCUMENTS

2018/0167906 A1   6/2018  Chellamani et al.
2020/0053044 A1*  2/2020  Mahalank .......... H04L 63/0876

* cited by examiner

USER DATA

| | |
|---|---|
| char imsi[16]; | USER IDENTIFIER |
| time_t time; | SIGNAL RECEPTION TIME |
| u_int_time; | MOVEMENT TIME |
| u_int mcc1; | PREVIOUS TRANSMISSION SOURCE COUNTRY INFORMATION |
| u_int mcc2; | TRANSMISSION SOURCE COUNTRY INFORMATION IMMEDIATELY BEFORE PREVIOUS TRANSMISSION SOURCE COUNTRY |
| struct imsilist *next; | NEXT DATA ADDRESS |

Fig. 4

DATA REGARDING MOVEMENT BETWEEN COUNTRIES

| char fromto[8]; | MOVEMENT COUNTRY NAME |
|---|---|
| u_int time; | MOVEMENT TIME |
| u_int count; | NUMBER OF MOVEMENTS DETECTED |
| struct fromlist *next; | NEXT DATA ADDRESS |

Fig. 5

LEARNING APPARATUS, DETERMINATION SYSTEM, LEARNING METHOD, AND NON-TRANSITORY COMPUTER READABLE MEDIUM

This application is a National Stage Entry of PCT/JP2021/009706 filed on Mar. 11, 2021, which claims priority from Japanese Patent Application 2020-063874 filed on Mar. 31, 2020, the contents of all of which are incorporated herein by reference, in their entirety.

TECHNICAL FIELD

The present invention relates to a learning apparatus, a determination system, a learning method, and a non-transitory computer readable medium.

BACKGROUND ART

As a method for analyzing a short message wiretapping attack on a mobile phone, a geographic impossibility detection method is used. The geographic impossibility detection method is a method for detecting that a request for updating position information of User Equipment (UE) is received from a country which the UE cannot be moved to in time. In order to perform the geographic impossibility detection method, it is necessary to calculate a period of time within which the UE can be moved based on a statistic in advance.

Patent Literature 1 discloses a method for collecting position information transmitted by a UE. It also discloses a method for collecting, from the position information transmitted by the UE, transmission source country information and the transmission times regarding the UE. Patent Literature 2 discloses a method for calculating a movement time of a UE between countries by using position information of the UE when the UE has been moved between the countries.

CITATION LIST

Patent Literature

Patent Literature 1: Japanese Unexamined Patent Application Publication No. 2008-301435
Patent Literature 2: United States Patent Application Publication No. 2018/0167906

SUMMARY OF INVENTION

Technical Problem

In the learning apparatus disclosed in Patent Literature 2, training data used to create a learning model may include a spoofing signal from a malicious attacker. Therefore, there is a problem that the accuracy of the geographic impossibility detection is reduced.

The present disclosure has been made to solve the above-described problem and an object thereof is to provide a learning apparatus, a determination system, a learning method, and a non-transitory computer readable medium that are capable of improving the accuracy of a geographic impossibility detection.

Solution to Problem

A learning apparatus according to the present disclosure includes: collection means for acquiring, from a collection apparatus configured to collect requests for updating position information of user terminals, a plurality of reception signal data pieces including transmission source countries and reception times of the collected requests for updating the position information; generation means for generating, for each of the user terminals, user data including a movement history between two countries in one direction and a movement time between the two countries in the one direction based on the acquired plurality of reception signal data pieces; and learning means for learning a statistical value of the movement time between the two countries in the one direction based on the generated user data for each of the user terminals.

A determination system according to the present disclosure includes: the learning apparatus; and a determination apparatus configured to determine, based on data regarding movement between countries generated by the learning apparatus, whether or not a user terminal is able to be moved between the countries, in which the determination apparatus collects reception signal data including a transmission source country where the user terminal has transmitted a request for updating position information and a reception time at which a relay apparatus has received the request for updating position information, the determination apparatus detects, based on the collected reception signal data, a country where the user terminal is located before it is moved and a country where the user terminal is located after it is moved, and a movement time of the user terminal between the countries, and between the countries where the user terminal are moved, when the detected movement time of the user terminal between the countries is shorter by a predetermined time than the movement time between the countries included in the data regarding the movement between the countries, the determination apparatus determines that the user terminal is not able to be moved between the countries.

A learning method according to the present disclosure includes: acquiring, from a collection apparatus configured to collect requests for updating position information of user terminals, a plurality of reception signal data pieces including transmission source countries and reception times of the collected requests for updating the position information; generating, for each of the user terminals, user data including a movement history between two countries in one direction and a movement time between the two countries in the one direction based on the acquired plurality of reception signal data pieces; and learning a statistical value of the movement time between the two countries in the one direction based on the generated user data for each of the user terminals.

A non-transitory computer readable medium according to the present disclosure stores a program for causing a computer to: acquire, from a collection apparatus configured to collect requests for updating position information of user terminals, a plurality of reception signal data pieces including transmission source countries and reception times of the collected requests for updating the position information; generate, for each of the user terminals, user data including a movement history between two countries in one direction and a movement time between the two countries in the one direction based on the acquired plurality of reception signal data pieces; and learn a statistical value of the movement time between the two countries in the one direction based on the generated user data for each of the user terminals.

Advantageous Effects of Invention

According to the present disclosure, it is possible to provide a learning apparatus, a determination system, a

BRIEF DESCRIPTION OF DRAWINGS

FIG. 4 is a block diagram showing a data structure of user data;

FIG. 5 is a block diagram showing a data structure of data regarding movement between countries;

EXAMPLE EMBODIMENT

Specific example embodiments to which the present disclosure is applied will be described hereinafter in detail with reference to the drawings. The same elements are denoted by the same reference symbols throughout the drawings, and redundant descriptions will be omitted as necessary for the clarification of the description.

First Example Embodiment

A first example embodiment of the present disclosure will be described below.

Figure 1:
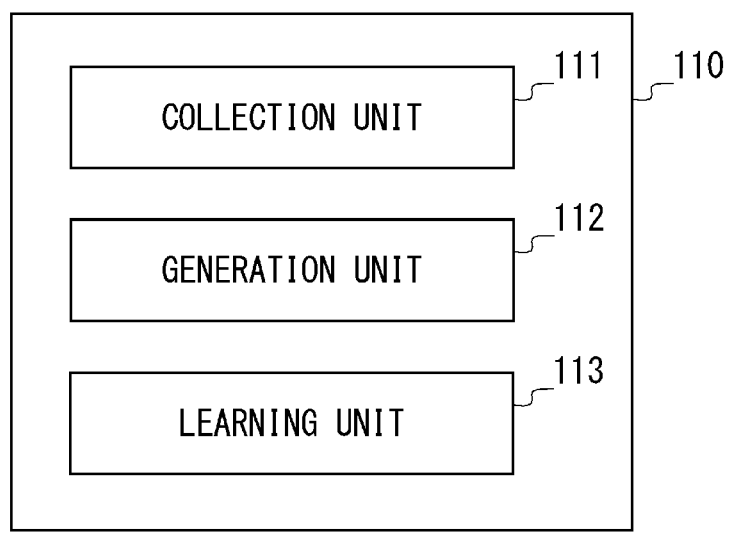
FIG. 1 is a block diagram showing a configuration of a learning apparatus 110 according to a first example embodiment.

First, a configuration of a learning apparatus 110 according to the first example embodiment will be described with reference to FIG. 1. FIG. 1 is a block diagram showing the configuration of the learning apparatus 110 according to the first example embodiment. The learning apparatus 110 according to the first example embodiment includes a collection unit 111, a generation unit 112, and a learning unit 113.

The collection unit 111 acquires, from a collection apparatus that collects requests for updating position information of user terminals, a plurality of reception signal data pieces including transmission source countries and reception times of the collected requests for updating position information. The generation unit 112 generates, for each of the user terminals, user data including a movement history between two countries in one direction and a movement time between the two countries in the one direction based on the acquired plurality of reception signal data pieces. The learning unit 113 learns a statistical value of the movement time between the two countries in the one direction based on the generated user data for each of the user terminals.

Training data used to create a learning model may include not only reception signal data including a request signal for updating position information of a user terminal, but also reception signal data including a spoofing signal from a malicious attacker. In this case, an event occurs in which the user terminal appears to be moved back and forth between two countries. Therefore, the learning apparatus 110 according to the first example embodiment generates, from reception signal data of a user terminal including a movement history between two countries in one direction, user data including the movement history between the two countries in the one direction and a movement time between the two countries in the one direction. That is, the learning apparatus 110 includes means for eliminating illegal data that may be spoofed by an attacker from training data used to generate a learning model. Therefore, the learning apparatus 110 according to the first example embodiment improves the accuracy of the learning model used in a geographic impossibility detection method. Thus, it is possible to reduce the man-hours needed for each user to perform an illegal confirmation of the movement time in the learning model.

Second Example Embodiment

A second example embodiment of the present disclosure will be described below.

Figure 2:
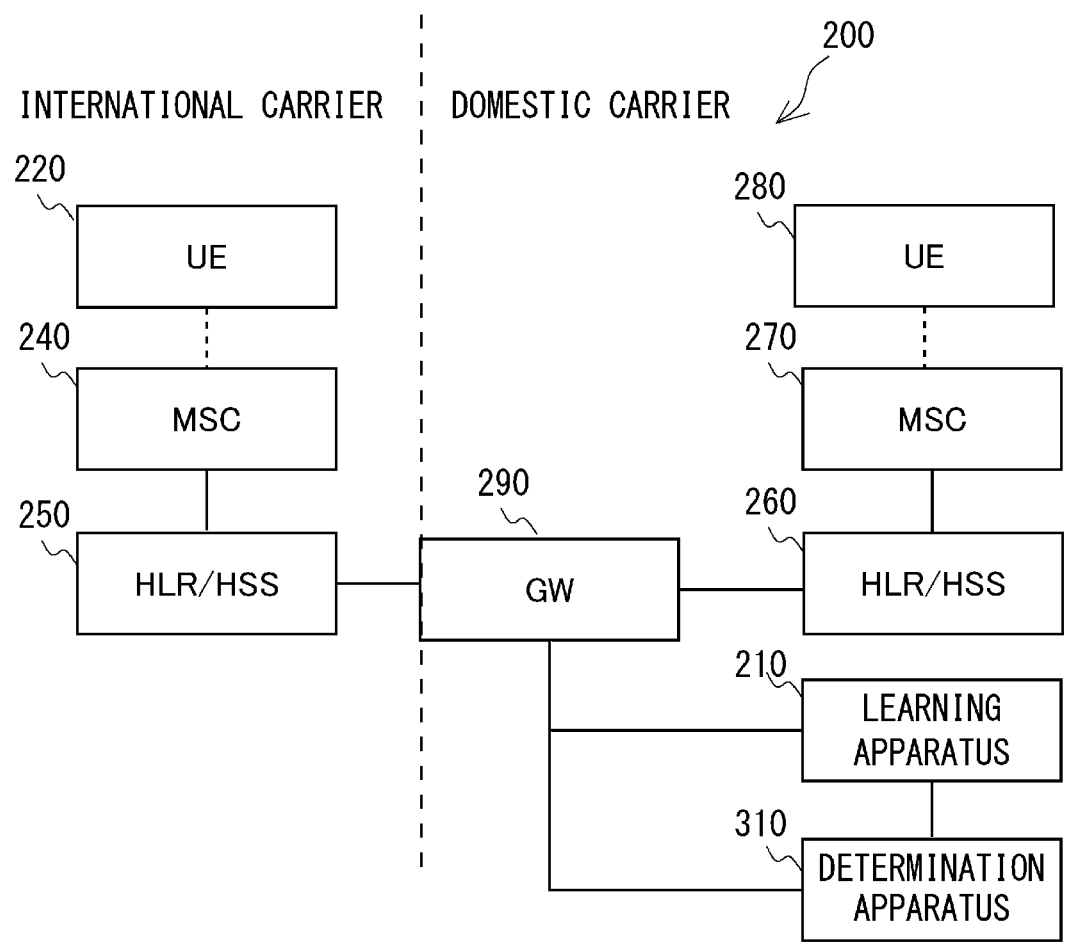
FIG. 2 is a block diagram showing a configuration of a communication environment 200 according to a second example embodiment.

First, a configuration of a communication environment 200 according to the second example embodiment will be described with reference to FIG. 2. FIG. 2 is a block diagram showing the configuration of the communication environment 200 according to the second example embodiment. The communication environment 200 includes a learning apparatus 210, a UE 220, a Mobile Switching Center (MSC) 240, a Home Location Register/Home Subscriber Server (HLR/HSS) 250, an HLR/HSS 260, an MSC 270, and a UE 280. Note that the MSC 240 and the HLR/HSS 250 are owned by an international carrier. On the other hand, the HLR/HSS 260 and the MSC 270 are owned by a domestic carrier.

The UE 220 is a mobile communication terminal which transmits a request signal for updating position information including its own position information to the HLR/HSS 260 when, for example, it is moved to a certain area or its power source is turned on or off. Note that the area means, for example, a region or a country. The UE 220 includes, for example, a mobile device, a computer, a tablet computing platform, or a smartphone. The UE 220 has a roaming function, and can receive a service of a contracted communication carrier by using facilities of other affiliated carriers even when it is located outside the service range of the communication carrier. Further, the UE 280 has a configuration similar to that of the UE 220.

The MSC 240 connects and exchanges calls and messages in the UE 220. When the UE 220 is moved to an area covered by the MSC 240, the MSC 240 acquires subscriber information from, for example, the HLR/HSS 250 and performs user authentication. The MSC 270 also has a similar function. Note that the MSC 270 is owned by a domestic carrier. Further, the MSC 240 is owned by an international carrier.

The HLR/HSS 260 updates position information of the UE 220 according to a request signal for updating position information transmitted by the UE 220. Further, the HLR/HSS 260 stores subscriber information items in a network. For example, it stores position information of the UE 220, service conditions such as fee plans for subscribed services, and authentication information for preventing unauthorized use. The HLR/HSS 250 has a function similar to that of the HLR/HSS 260. Note that the HLR/HSS 250 is owned by an international carrier. Further, the HLR/HSS 260 is owned by a domestic carrier.

A GW 290 is a gateway that connects a network of an international carrier to a network of a domestic carrier. The GW 290 receives a request signal for updating position information transmitted by the UE 220. In the following description, data of the request signal for updating position information transmitted by the UE 220, which data is received by the GW 290, is referred to as reception signal data.

The learning apparatus 210 collects reception signal data received by the GW 290. The learning apparatus 210 generates training data (user data) from reception signal data and generates a learning model (data regarding movement between countries) from the user data. The data regarding movement between countries is used to perform a geographic impossibility detection method. The geographic impossibility detection method is used, for example, to analyze a short message wiretapping attack on a mobile phone. Note that the learning apparatus 210 may be provided in the HLR/HSS 260. The detailed configuration of the learning apparatus 210 will be described later.

Figure 13:
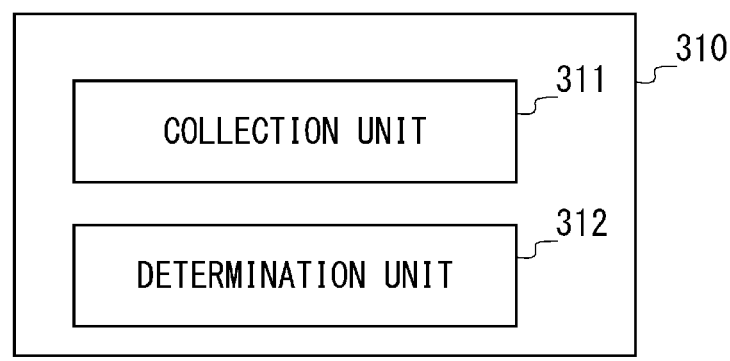
FIG. 13 is a block diagram showing a configuration of the determination apparatus 310 according to the second example embodiment.

A determination apparatus 310 performs geographic impossibility detection. As shown in FIG. 13, the determination apparatus 310 includes a collection unit 311 and a determination unit 312. FIG. 13 is a block diagram showing a configuration of the determination apparatus 310 according to the second example embodiment. The collection unit 311 collects reception signal data received by the GW 290. The determination unit 312 calculates a movement time of the UE 220 between countries (i.e., a time required for the UE 220 to be moved between countries) based on the reception signal data. The determination unit 312 calculates a difference between the movement time of the UE 220 between the countries and the movement time between the countries included in data regarding movement between the countries stored in a storage unit 216 of the learning apparatus 210. Then, when the difference between these movement times is longer than a predetermined time, the determination unit 312 determines that the UE 220 cannot be moved between the countries.

Figure 3:
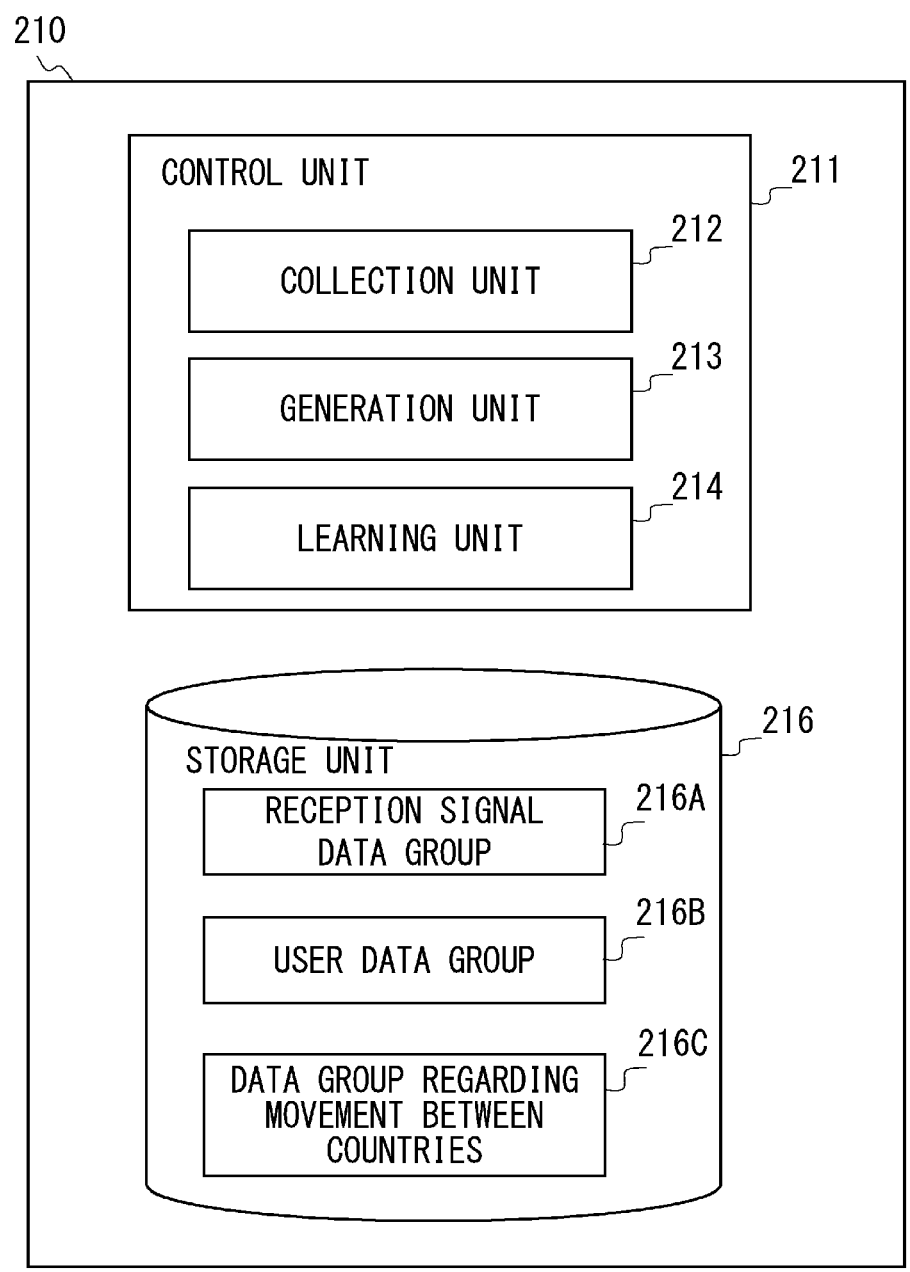
FIG. 3 is a block diagram showing a configuration of a learning apparatus 210 according to the second example embodiment.

Next, the configuration of the learning apparatus 210 according to the second example embodiment will be described with reference to FIG. 3. FIG. 3 is a block diagram showing a configuration of the learning apparatus 210 according to the second example embodiment. The learning apparatus 210 creates a learning model from operation data. The learning apparatus 210 includes a control unit 211 and the storage unit 216.

The control unit 211 controls operations performed by the learning apparatus 210. The control unit 211 is, for example, a microprocessor, a Micro Processing Unit (MPU), or a Central Processing Unit (CPU). The control unit 211 includes a collection unit 212, a generation unit 213, and a learning unit 214.

The collection unit 212 collects reception signal data from the GW 290 and stores them in the storage unit 216. The reception signal data includes position information of the UE 220. Specifically, the reception signal data includes terminal information of the UE 220, such as a user identifier, a signal reception time, and a transmission source country. The user identifier is an identifier that identifies the UE 220. The signal reception time is the time at which the GW 290 receives a request signal for updating position information of the UE 220. The signal reception time is, for example, the time in the country where the GW 290 is located. The transmission source country is the country where the UE 220 has transmitted the request signal for updating position information. Further, the reception signal data is obtained by collecting Packet Captures (PCAPs) in the GW 290 and converting them into text. Note that not only the GW 290 but also a network node such as the HLR/HSS 260 receives the position information of the UE 220 and generates reception signal data. Further, the collection unit 212 may collect the reception signal data.

The generation unit 213 creates or updates user data from the reception signal data. The user data indicates data of a user to be referred to for creating data regarding movement between countries. The user data has a data structure shown in FIG. 4. FIG. 4 is a block diagram showing the data structure of user data. The user data includes items of a user identifier, a signal reception time, a movement time, a previous transmission source country, a transmission source country immediately before the previous transmission source country, and a next data address. The user identifier is an identifier that identifies the UE 220. The signal reception time is the time at which the GW 290 receives a request signal for updating position information transmitted by the UE 220 when the UE 220 is located in the previous transmission source country. The signal reception time includes, for example, data in which seconds are used as a unit. The movement time is the time required for the UE 220 to be moved from the transmission source country immediately before the previous transmission source country to the previous transmission source country. The movement time includes, for example, data in which seconds are used as a unit. The transmission source country immediately before the previous transmission source country is the country where the UE 220 is located before the previous transmission source country. The previous transmission source country and the transmission source country immediately before the previous transmission source country include, for example, data in which a Mobile Country Code (MCC) is used. The next data address is an address of the next user data for associating it with the next user data.

The learning unit 214 creates or updates data regarding movement between countries from user data. The data regarding movement between countries is data indicating a movement time required for the UE220 to be moved between countries and is for creating a learning model. The data regarding movement between countries has a data structure shown in FIG. 5. FIG. 5 is a block diagram showing the data structure of the data regarding movement between countries. The data regarding movement between countries includes items of a movement country name, a movement time, the number of movements detected, and a next data address. The movement country name includes data of the country where the UE 220 is located before it is moved and data of the country where the UE 220 is located after it is moved, which data pieces are stored in the order of the country where the UE 220 is located before it is moved and the country where the UE 220 is located after it is moved. The movement country name includes, for example, data in which the MCC was used. The movement time is the time required for the UE 220 to be moved between the countries. The number of movements detected is the number obtained by counting the number of movements between the countries. The next data address is an address of the next data regarding movement between countries for associating it with the next data regarding movement between countries.

The storage unit 216 stores a reception signal data group 216A, a user data group 216B, and a data group 216C regarding movement between countries. The storage unit 216 is, for example, a Hard Disk Drive (HDD) which is a large-capacity recording medium, Read Only Memory (ROM) which is a semiconductor memory such as a mask ROM or PROM, and a Random Access Memory (RAM) such as a DRAM or SRAM.

Figure 6:
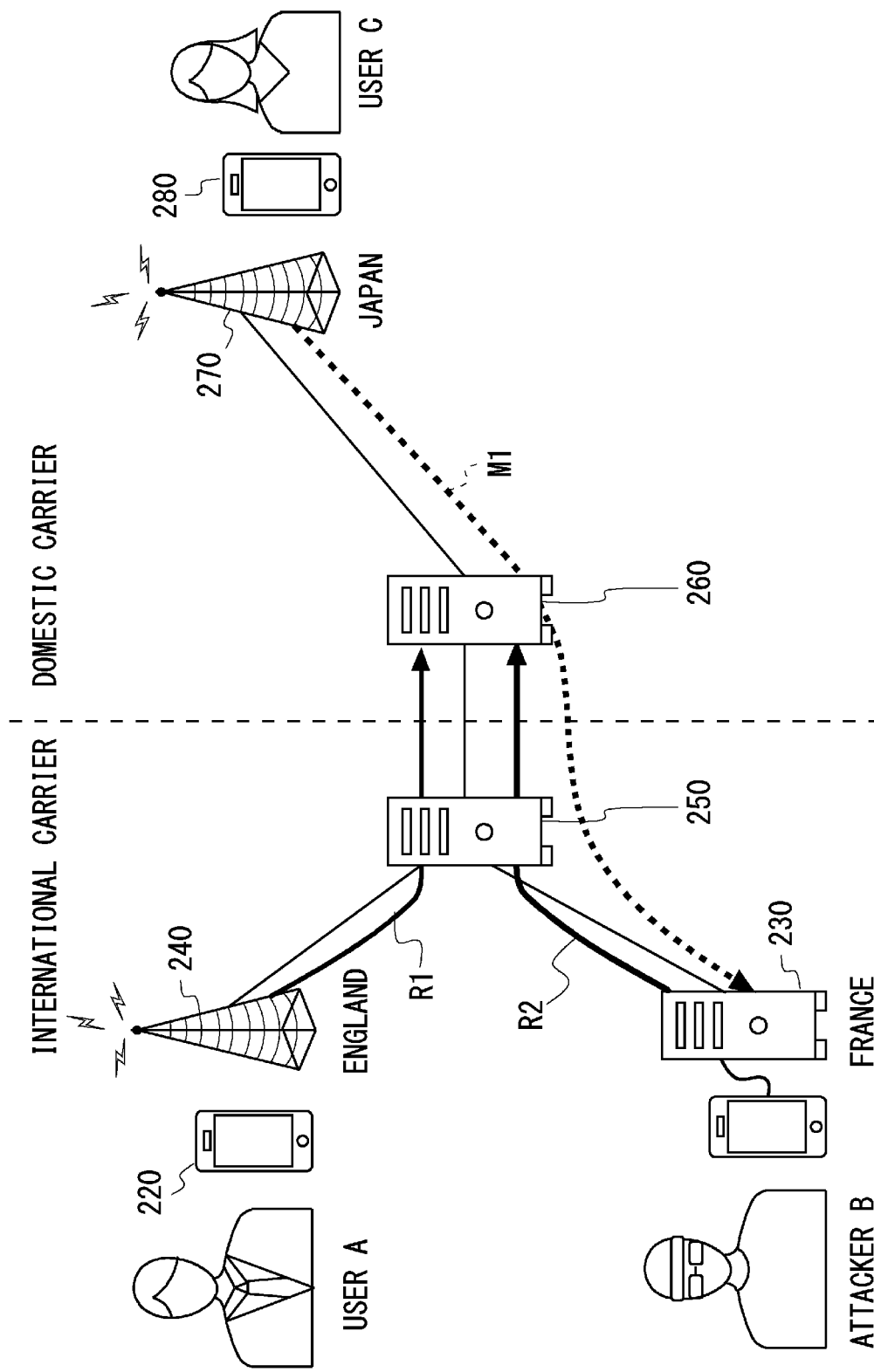
FIG. 6 is a schematic diagram showing an example of a short message wiretapping attack on a mobile phone.

Next, an example of a short message wiretapping attack on a mobile phone will be described with reference to FIG. 6. FIG. 6 is a schematic diagram showing the example of a short message wiretapping attack on a mobile phone. A user C transmits a short message M1 to a user A. An attacker B conducts a wiretap on the short message M1.

A spoofing apparatus 230 is an apparatus used by the attacker B to conduct a wiretap on the short message M1. The spoofing apparatus 230 is disguised as the UE 220 and transmits its own position information to the HLR/HSS 260. That is, the HLR/HSS 260 is under the illusion that the spoofing apparatus 230 is the UE 220. For example, the spoofing apparatus 230 may be a server, or may have a configuration in which a mobile communication terminal is connected to a server.

When the user A moves from Japan to England, the UE 220 of the user A transmits a request signal R1 for updating position information to the HLR/HSS 260 on the Japan side via the MSC 240. The HLR/HSS 260 records that the UE 220 is in England (is not roaming). After that, the attacker B in France impersonates the user A. Then, the spoofing apparatus 230 used by the attacker B transmits a request signal R2 for updating position information to the HLR/HSS 260 using its own position information. The HLR/HSS 260 records that the UE 220 is in France. That is, the HLR/HSS 260 is under the illusion that the user A is in France.

After that, when the UE 280 of the user C transmits the short message M1 to the UE 220 of the user A, the HLR/HSS 260 on the Japan side determines that the UE 220 is in France. Then, the HLR/HSS 260 transmits the short message M1 to the spoofing apparatus 230 in France. Then, the attacker B can acquire the short message M1 by accessing the spoofing apparatus 230. That is, the attacker B can conduct a wiretap on the short message M1.

Figure 7:
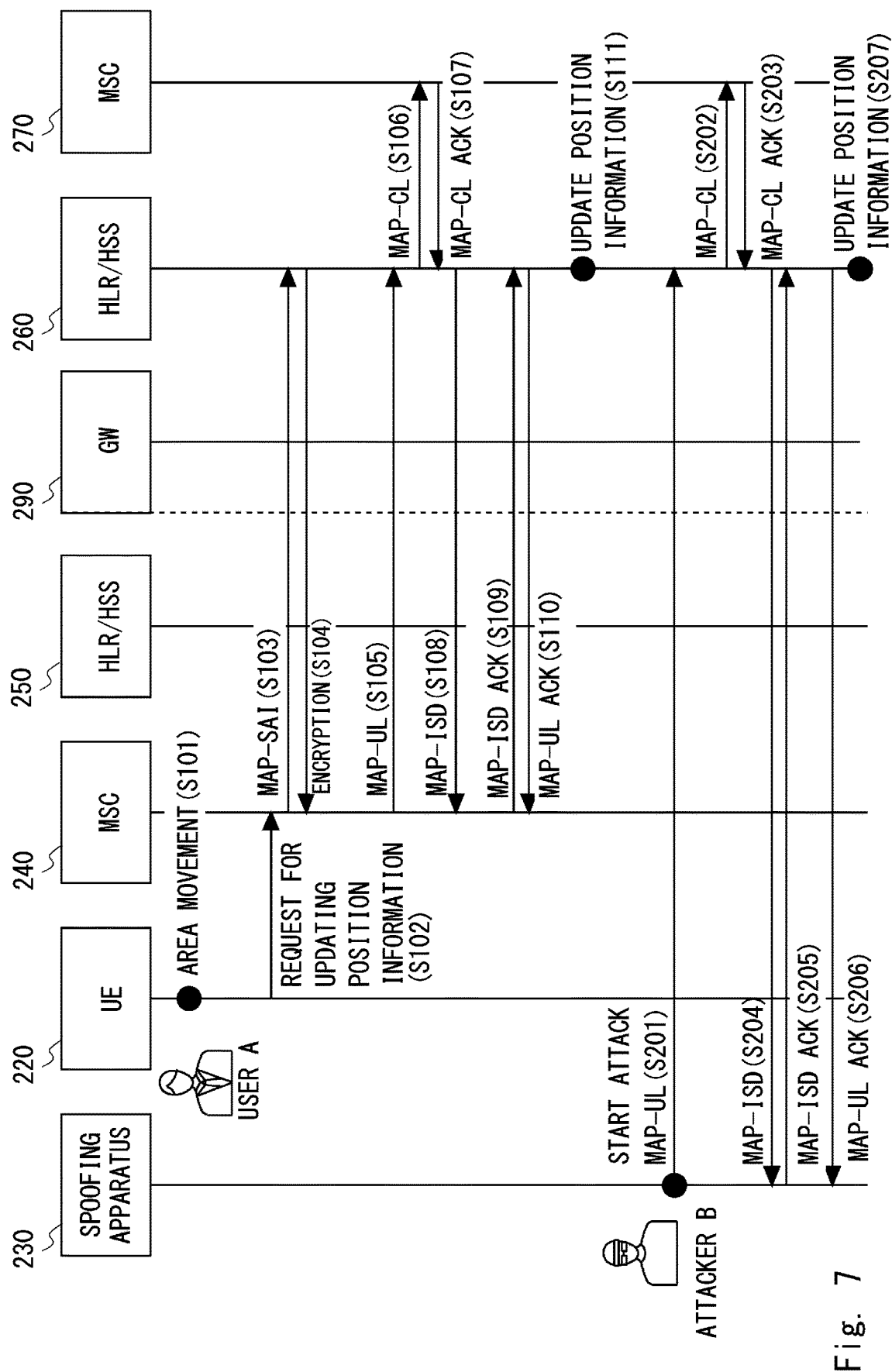
FIG. 7 is a sequence diagram showing a communication sequence of the communication environment 200 according to the second example embodiment.

Next, a communication sequence of the communication environment 200 according to the second example embodiment will be described with reference to FIG. 7. FIG. 7 is a sequence diagram showing the communication sequence of the communication environment 200 according to the second example embodiment.

A communication sequence in the case in which the position information of the HLR/HSS 260 is normally updated will be described. First, the user A staying overseas moves from an area where he/she is staying to another area (S101). The UE 220 transmits a request for updating position information including area information where the UE 220 is located to the MSC 240 (S102). The MSC 240 transmits an authentication request (MAP-SAI) to the HLR/HSS 260 (S103). In the case of the local network user, the HLR/HSS 260 transmits an encrypted response to the authentication request to the MSC 240 (S104). The MSC 240 transmits a request for updating position information (MAP-UL) to the HLR/HSS 260 (S105). If the position information of the UE 220 is left in the MSC 270, the HLR/HSS 260 transmits a clear request (MAP-CL) (S106). The MSC 270 transmits a response to the clear request (MAP-CL ACK) to the HLR/HSS 260 (S107). The HLR/HSS 260 transmits a request for changing user data (MAP-ISD) to the MSC 240 (S108). The MSC 240 transmits a response to the request for changing user data (MAP-ISD ACK) to the HLR/HSS 260 (S109). The HLR/HSS 260 transmits a response to the request for updating position information (MAP-UL ACK) to the MSC 240 (S110). The HLR/HSS 260 updates the position information to a new area (S111).

The communication sequence in the case in which the attacker B impersonates the user A and updates position information of the HLR/HSS 260 will be described. The spoofing apparatus 230 transmits a request for updating position information (MAP-UL) including area information where the spoofing apparatus 230 is located in the HLR/HSS 260 (S201). When local network user information and encryption information are spoofed, the HLR/HSS 260 transmits a clear request (MAP-CL) if the position information is left in the MSC 270 (S202). The MSC 270 transmits a response to the clear request (MAP-CL ACK) to the HLR/HSS 260 (S203). The HLR/HSS 260 transmits a request for changing user data (MAP-ISD) to the spoofing apparatus 230 (S204). The spoofing apparatus 230 transmits a response to the request for changing user data (MAP-ISD ACK) to the HLR/HSS 260 (S205). The HLR/HSS 260 transmits a response to the request for updating position information (MAP-UL ACK) to the spoofing apparatus 230 (S206). The HLR/HSS 260 updates the position information to position information of a spoofing system (S207).

The GW 290 receives the request for updating position information (MAP-UL) (S105) transmitted by the UE 220. Further, the GW 290 receives the request for updating position information (MAP-UL) (S201) transmitted by the spoofing apparatus 230. When the GW 290 receives the request for updating position information, it creates reception signal data. Then, the learning apparatus 210 and the determination apparatus 310 collect the reception signal data received by the GW 290.

Next, a geographic impossibility detection method for detecting a wiretapping attack by an attacker will be described. The determination apparatus 310 detects a wiretapping attack by an attacker by using the geographic impossibility detection method. The wiretapping attack is, for example, a short message wiretapping attack on a mobile phone. The geographic impossibility detection method is a method for detecting that a request signal for updating position information is transmitted from a place which a user cannot go to in time.

Figure 8:
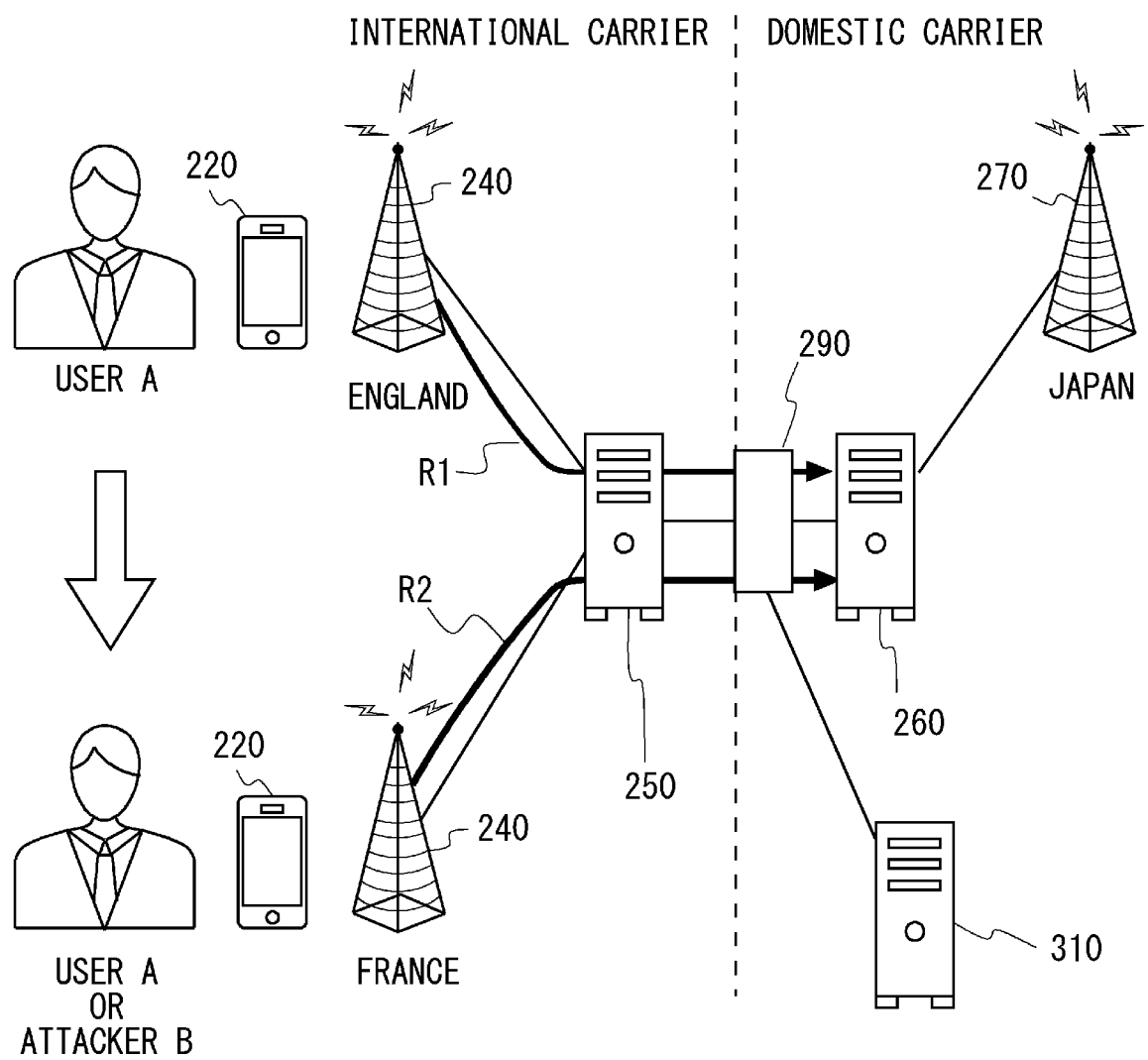
FIG. 8 is a schematic diagram showing a geographic impossibility detection method used by a determination apparatus 310 according to the second example embodiment.

A geographic impossibility detection method used by the determination apparatus 310 according to the second example embodiment will be described with reference to FIG. 8. FIG. 8 is a schematic diagram showing the geographic impossibility detection method used by the determination apparatus 310 according to the second example embodiment.

The GW 290 receives the request signal R1 for updating position information of the UE 220. When the UE 220 is moved between countries (e.g., from England to France), the GW 290 receives a request signal R2 for updating position information of the UE 220. The GW 290 generates reception signal data in which a reception time is added to the request signal for updating position information. The collection unit 311 of the determination apparatus 310 collects reception signal data corresponding to the request signal R1 for updating position information or reception signal data corresponding to the request signal R2 for updating position information. The determination unit 312 acquires the reception signal data and calculates a movement time between the countries from a difference between the reception time of the request signal R1 for updating position information and the reception time of the request signal R2 for updating position information in the GW 290. The determination unit 312 calculates a difference between the movement time of the UE 220 between the countries and the movement time between countries included in data regarding movement between the countries stored in the storage unit 216 of the learning apparatus 210. When the difference between these movement times is longer than a predetermined time, the determination unit 312 determines that the UE 220 cannot be moved between the countries. That is, the determination apparatus 310 determines that a wiretapping attack by the spoofing apparatus 230 of the attacker B may have occurred.

Figure 9:
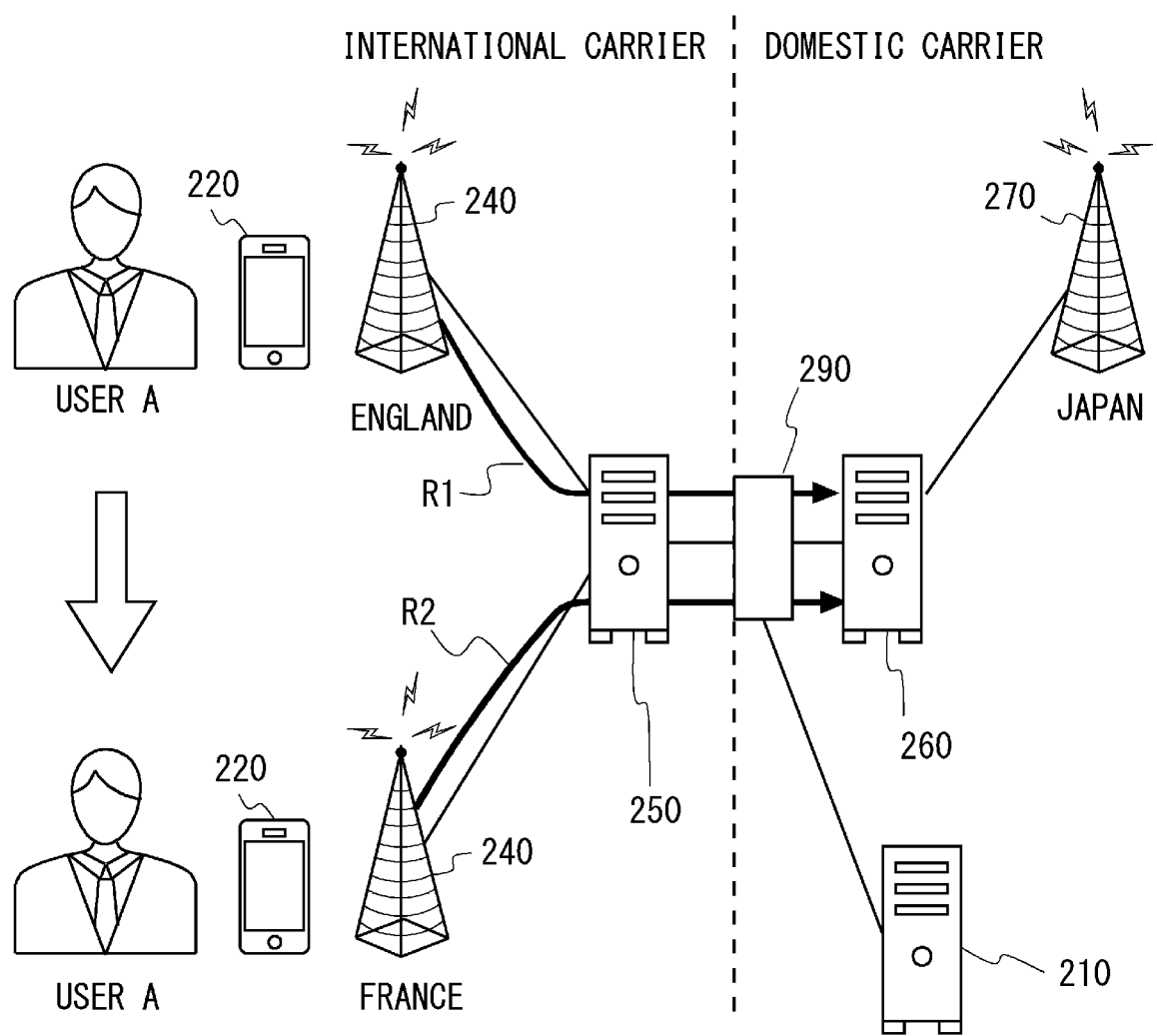
FIG. 9 is a schematic diagram showing an example of a method for creating a learning model in the learning apparatus 210 according to the first example embodiment.
Figure 10:
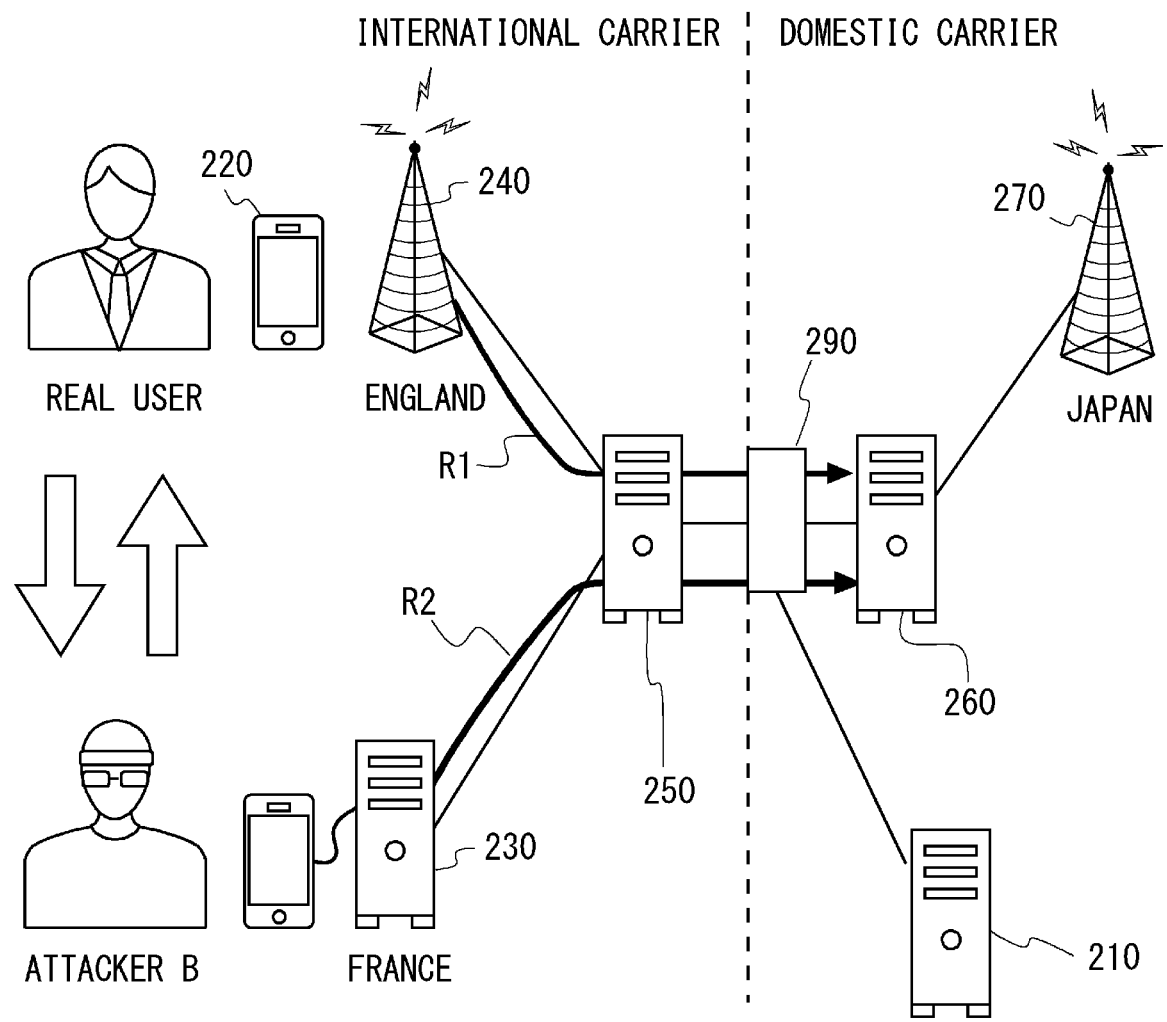
FIG. 10 is a schematic diagram showing an example of a method for denoising a learning model in the learning apparatus 210 according to the first example embodiment.

In order for the determination apparatus 310 to perform the geographic impossibility detection method, the learning apparatus 210 creates data regarding movement between the countries for which the movement time between the countries is calculated in advance. An outline of the operations performed by the learning apparatus 210 according to the first example embodiment will be described with reference to FIGS. 9 and 10. FIG. 9 is a schematic diagram showing an example of a method for creating a learning model in the learning apparatus 210 according to the first example embodiment. FIG. 10 is a schematic diagram showing an example of a method for denoising a learning model in the learning apparatus 210 according to the first example embodiment.

First, an example of the method for creating a learning model in the learning apparatus 210 according to the first example embodiment will be described with reference to FIG. 9. The GW 290 receives the request signal R1 for updating position information transmitted by the UE 220. In this case, reception signal data received by the GW 290 includes information about the transmission source country (England) of the UE 220 and the reception time at which the GW 290 has received the data. Next, the GW 290 receives the request signal R2 for updating position information transmitted by the UE 220. In this case, reception signal data includes information about the transmission source country (France) of the UE 220 and the reception time at which the GW 290 has received the data. The learning apparatus 210 collects these reception signal data pieces from the GW 290. Since the learning apparatus 210 determines that the transmission source country of the UE 220 has changed from England to France, the movement time between the countries is calculated from the difference between the reception times. Then the learning apparatus 210 generates data regarding movement between the countries from the calculated movement time between the countries.

Next, an example of the method for denoising a learning model in the learning apparatus 210 will be described with reference to FIG. 10. In this example, the learning apparatus 210 does not use the reception signal data received from the UE 220 which has been moved back and forth between countries to create the data regarding movement between the countries. This is because when an attack by an attacker has occurred, an event occurs in which the UE 220 appears to be moved back and forth between the countries. Specifically, the UE 220 of the user A transmits the request signal R1 for updating position information to the HLR/HSS 260 and updates the position information. After that, when a spoofing attack has occurred by the spoofing apparatus 230 of the attacker B, the spoofing apparatus 230 transmits the request signal R2 for updating position information to the HLR/HSS 260 and updates the position information as the UE 220. At this time, a state of the UE 220 of the user A has been changed to an out-of-service state. Then, the UE 220 of the user A transmits a request signal for updating position information to the HLR/HSS 260 and updates the position information. Thus, an event occurs in which the UE 220 appears to be moved back and forth between the countries.

The GW 290 receives the request signal R1 for updating position information transmitted by the UE 220. In this case, reception signal data received by the GW 290 includes information about the transmission source country (England) of the UE 220 and the reception time at which the GW 290 has received the data. Next, the GW 290 receives the request signal R2 for updating position information transmitted by the UE 220. In this case, reception signal data includes information about the transmission source country (France) of the UE 220 and the reception time at which the GW 290 has received the data. The GW 290 receives the request signal R1 for updating position information transmitted by the UE 220. In this case, reception signal data received by the GW 290 includes information about the transmission source country (England) of the UE 220 and the reception time at which the GW 290 has received the data. The learning apparatus 210 collects these reception signal data pieces from the GW 290. Since the learning apparatus 210 determines that the transmission source country of the UE 220 has been changed between England and France, it does not use the reception signal data of the UE 220 to create the data regarding movement between the countries.

Figure 11:
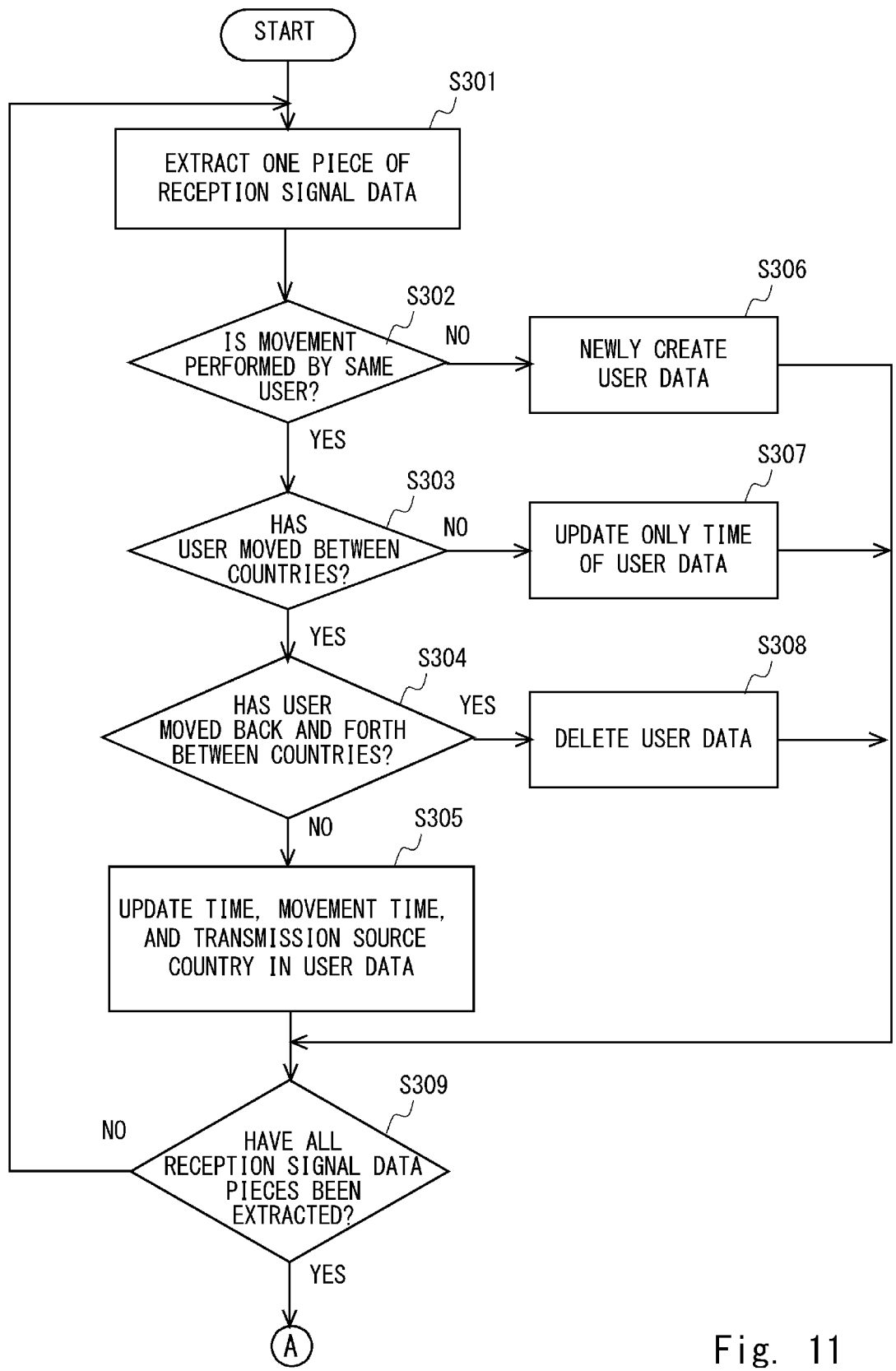
FIG. 11 is a flowchart showing operations by which the learning apparatus 210 according to the second example embodiment generates user data.
Figure 12:
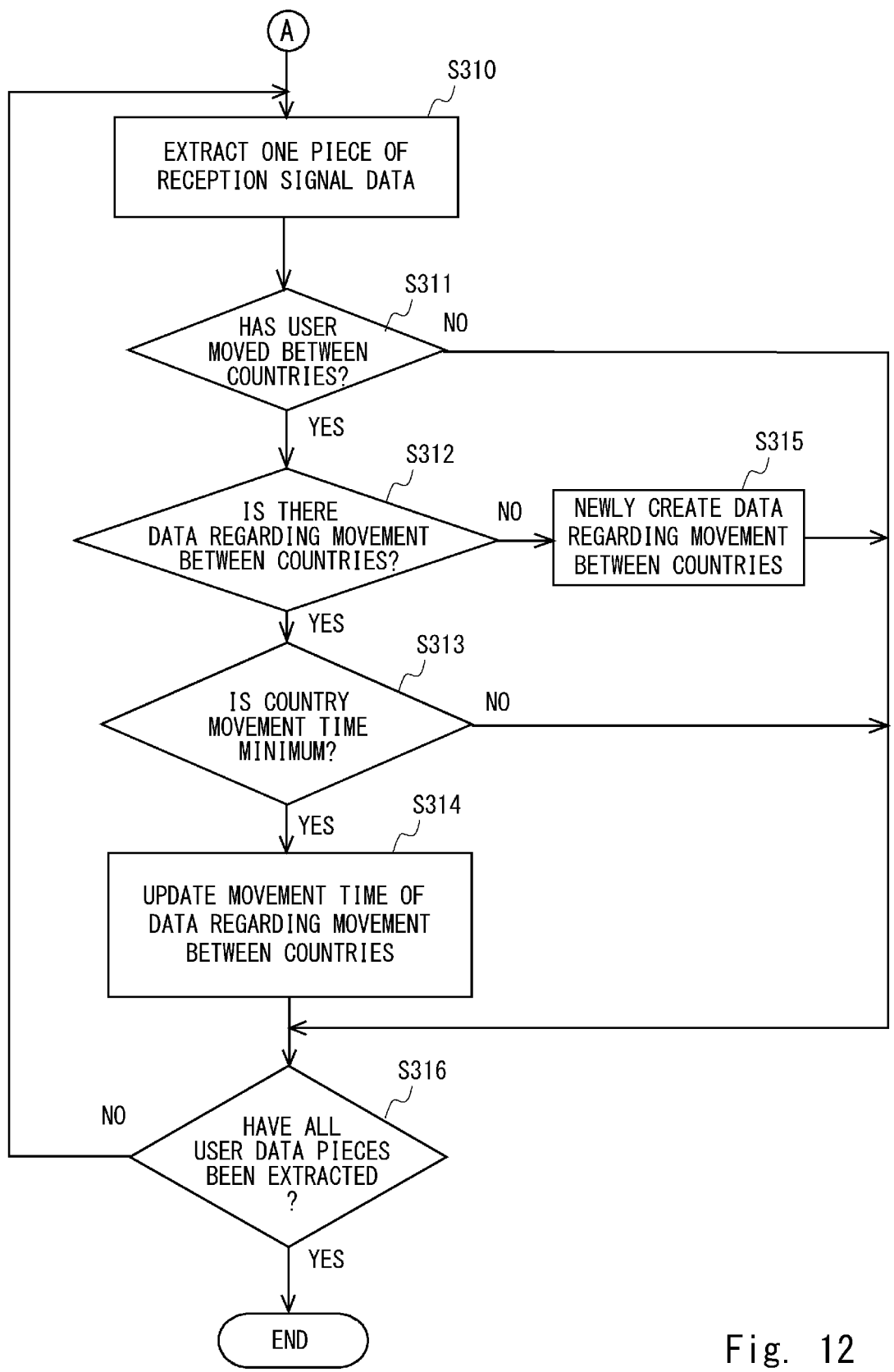
FIG. 12 is a flowchart showing operations by which the learning apparatus 210 according to the second example embodiment generates data regarding movement between countries.

Next, operations performed by the learning apparatus 210 according to the second example embodiment will be described in detail with reference to FIGS. 11 and 12. FIG. 11 is a flowchart showing the operations by which the learning apparatus 210 according to the second example embodiment generates user data. FIG. 12 is a flowchart showing the operations by which the learning apparatus 210 according to the second example embodiment generates data regarding movement between countries. It is assumed that the collection unit 212 collects a plurality of reception signal data pieces from the storage unit 216, which operation is not shown.

The learning apparatus 210 creates user data and data regarding movement between countries based on the reception signal data. As shown in FIG. 11, the generation unit 213 creates user data in S301 to S309. Next, as shown in FIG. 12, the learning unit 214 creates data regarding movement between countries in S310 to S316.

The collection unit 212 collects reception signal data for several days in the GW 290 and stores them in the reception signal data group 216A of the storage unit 216.

First, the generation unit 213 reads all the reception signal data pieces collected by the collection unit 212 from the reception signal data group 216A of the storage unit 216, and extracts one piece of reception signal data from them (S301).

Next, the generation unit 213 checks whether or not the movement is performed by the same user (S302). That is, the generation unit 213 checks whether or not the user of the extracted reception signal data has been registered in the user data group 216B. Specifically, the generation unit 213 checks whether or not there is user data having a user identifier that matches the user identifier of the reception signal data from the user data group 216B. When there is matching user data, the generation unit 213 determines that the movement is performed by the same user. On the other hand, when there is no matching user data, the generation unit 213 determines that the movement is not performed by the same user.

When the movement is performed by the same user (S302 YES), the generation unit 213 extracts user data including a user identifier that matches the user identifier of the reception signal data from the user data group 216B, and uses the extracted user data in a process described later. Then the learning apparatus 210 proceeds to the process of S303. On the other hand, when the movement is not performed by the same user (S302 NO), the generation unit 213 newly creates user data (S306). Specifically, the generation unit 213 updates the user identifier of the new user data to the user identifier of the reception signal data. The generation unit 213 updates the signal reception time of the new user data to the signal reception time of the reception signal data. The generation unit 213 updates the previous transmission source country of the new user data to the transmission source country of the reception signal data. Then the generation unit 213 registers the user data in the user data group 216B of the storage unit 216. After that, the learning apparatus 210 proceeds to the process of S309.

Next, the generation unit 213 determines whether or not a user has moved between countries (S303). Specifically, when the transmission source country of the reception signal data does not match the previous transmission source country of the user data, the generation unit 213 determines that a user has moved between the countries (S303 YES). In this case, the learning apparatus proceeds to the step of S304. On the other hand, when the transmission source country of the reception signal data matches the transmission source country of the user data, the generation unit 213 determines that a user has not moved between the countries (S303 NO). In this case, the generation unit 213 updates the signal reception time of the user data to the signal reception time of the reception signal data (S307). After that, the learning apparatus 210 proceeds to the process of S309.

Next, the generation unit 213 checks whether or not the user has moved back and forth between the countries (S304). Specifically, when the transmission source country of the reception signal data does not match the transmission source country immediately before the previous transmission source country of the user data, the generation unit 213 determines that the user has not moved back and forth between the countries (S304 NO). Further, when country information is not stored in the transmission source country immediately before the previous transmission source country of the user data, the generation unit 213 determines that the user has not moved back and forth between the countries (S304 NO), and in this case, the generation unit 213 updates the time, the movement time, and the transmission source country included in the user data (S305). Specifically, the generation unit 213 updates the signal reception time of the user data to the signal reception time of the reception signal data. Then the generation unit 213 calculates a time difference between the signal reception time of the user data and the signal reception time of the reception signal data. When the time difference is smaller than the movement time of the user data, the generation unit 213 updates the movement time of the user data to the time difference. Further, the generation unit 213 updates the previous transmission source country of the user data to the transmission source country of the reception signal data. Then the generation unit 213 updates the transmission source country immediately before the previous transmission source country of the user data to the previous transmission source country of the user data. After that, the learning apparatus 210 proceeds to the process of S309. On the other hand, when the transmission source country of the reception signal data matches the transmission source country immediately before the previous transmission source country of the user data, the generation unit 213 determines that the user has moved back and forth between the countries (S304 YES). In this case, the generation unit 213 deletes the user data (S308). Specifically, the generation unit 213 deletes the corresponding user data from the user data group 216B. After that, the learning apparatus 210 proceeds to the process of S309.

Next, the generation unit 213 determines whether or not it has extracted all the reception signal data pieces from the reception signal data group 216A (S309). When the generation unit 213 has extracted all the reception signal data pieces (S309 YES), the learning apparatus 210 proceeds to the process of S310. On the other hand, when the generation unit 213 has not extracted all the received signal data pieces (S309 NO), the learning apparatus 210 proceeds to the process of S301.

Next, the learning unit 214 reads all the user data groups 216B from the storage unit 216 and extracts one piece of user data from them (S310).

Next, the learning unit 214 determines whether or not a user has moved between countries (S311). Specifically, when the previous transmission source country of the user data does not match the transmission source country immediately before the previous transmission source country of the user data, the learning unit 214 determines that a user has moved between the countries (S311 YES). Then, the learning apparatus 210 proceeds to the process of S312. On the other hand, when country information is stored in the previous transmission source country of the user data and country information is not stored in the transmission source country immediately before the previous transmission source country of the user data, the learning unit 214 determines that a user has not moved between the countries (S311 NO). After that, the learning apparatus 210 proceeds to the process of S316.

Next, the learning unit 214 determines whether or not there is data regarding movement between countries (S312). Specifically, the learning unit 214 determines, in the data group 216C regarding movement between countries, whether or not there is data regarding movement between countries in which the movement between countries matches that of the user data. The learning unit 214 determines whether or not the previous transmission source country of the user data matches the country after the movement of the data regarding movement between countries. Further, the learning unit 214 determines whether or not the transmission source country immediately before the previous transmission source country of the user data matches the country before the movement of the data regarding movement between countries. When the previous transmission source country of the user data matches the country after the movement of the data regarding movement between countries and the transmission source country immediately before the previous transmission source country of the user data matches the country before the movement of the data regarding movement between countries, the learning unit 214 determines that there is data regarding movement between countries (S312 YES). On the other hand, when the previous transmission source country of the user data does not match the country after the movement of the data regarding movement between countries or the transmission source country immediately before the previous transmission source country of the user data does not match the country before the movement of the data regarding movement between countries, the learning unit 214 determines that there is no data regarding movement between countries (S312 NO).

When there is data regarding movement between countries (S312 YES), the number of times of movement detection of the corresponding data regarding movement between countries is counted up by adding one thereto. After that, the learning apparatus 210 proceeds to the process of S313. Note that the learning apparatus 210 uses this data regarding movement between countries in a process described later. On the other hand, when there is no data regarding movement between countries (S312 NO), the learning unit 214 newly creates data regarding movement between countries (S315). Specifically, the learning unit 214 makes the country after the movement of the data regarding movement between countries correspond to the previous transmission source country of the user data, and makes the country before the movement of the data regarding movement between countries correspond to the transmission source country immediately before the previous transmission source country of the user data. The learning unit 214 stores, in the movement country name of the new data regarding movement between countries, information about the country before the movement of the data regarding movement between countries corresponding the transmission source country immediately before the previous transmission source country of the user data and the country after the movement of the data regarding movement between countries corresponding to the previous transmission source country of the user data. Then the learning unit 214 stores the movement time of the user data in the movement time included in the new data regarding movement between countries. Further, the learning unit 214 stores one in the number of times of movement detection of the new data regarding movement between countries. The learning unit 214 registers the new data regarding movement between countries in the data group 216C regarding movement between countries of the storage unit 216. After that, the learning apparatus 210 proceeds to the process of S316.

Next, the learning unit 214 determines whether or not the country movement time is minimum (S313). Specifically, when the movement time of the user data is smaller than the movement time of the data regarding movement between countries, the learning unit 214 determines that the country movement time is minimum (S313 YES). On the other hand, when the movement time of the user data is longer than the movement time of the data regarding movement between countries, the learning unit 214 determines that the country movement time is not minimum (S313 NO).

The reason why the learning unit 214 determines whether or not the country movement time is minimum will be described below. When an attacker performs a spoofing attack on the UE 220, the movement of the UE 220 between countries within a significantly short time, that is, within a period of time that the UE 220 cannot be actually moved between the countries, occurs. The determination apparatus 310 determines the movement of the UE 220 between the countries based on the movement time of the data regarding movement between the countries generated by the learning apparatus 210. In order to perform this determination, the learning apparatus 210 sets the movement time of the data regarding movement between the countries as the minimum movement time among the movement times of the user data pieces, and calculates a period of time within which the UE 220 can be actually moved between the countries.

When the country movement time is minimum (S313 YES), the learning unit 214 updates the movement time of the data regarding movement between countries (S314). Specifically, the learning unit 214 updates the movement time of the user data to the movement time of the data regarding movement between countries. After that, the learning apparatus 210 proceeds to the process of S316. On the other hand, when the country movement time is not minimum (S313 NO), the learning unit 214 does not update the data regarding movement between countries. After that, the learning apparatus 210 proceeds to the process of S316.

Next, the learning unit 214 checks whether or not all the user data pieces read from the storage unit 216 have been extracted (S316). When the learning unit 214 has extracted all the reception signal data pieces (S316 YES), the learning apparatus 210 ends the process. On the other hand, when the learning unit 214 has not extracted all the reception signal data pieces (S316 NO), the learning apparatus 210 proceeds to the process of S310.

In the learning apparatus 210 according to the second example embodiment, the collection unit 212 collects reception signal data pieces from the storage unit 216, and the generation unit 213 creates user data based on the collected data pieces. The generation unit 213 deletes the user data of a user who moves back and forth between the countries. Then, the learning unit 214 creates data regarding movement between countries based on the user data.

The learning apparatus 210 according to the second example embodiment includes means for eliminating illegal data that may be spoofed by an attacker from training data used to generate a learning model. Therefore, the learning apparatus 210 according to the second example embodiment improves the accuracy of the learning model used in a geographic impossibility detection method. Thus, it is possible to reduce the man-hours needed for each user to perform an illegal confirmation of the movement time in the learning model.

Modified Example 1 of the Learning Apparatus 210 According to the Second Example Embodiment A modified example 1 of the learning apparatus 210 according to the second example embodiment has a configuration similar to that of the learning apparatus 210 according to the second example embodiment. Operations performed by the modified example 1 are different from those performed by the learning apparatus 210 according to the second example embodiment.

In the learning apparatus 210 according to the second example embodiment, in the step S304 shown in FIG. 11, the generation unit 213 checks whether or not a user has moved back and forth between the countries. In the modified example 1, it is checked whether or not a user has moved back and forth between the countries within a predetermined period of time. Specifically, when the transmission source country included in the reception signal data do not match the transmission source country immediately before the previous transmission source country included in the user, the generation unit 213 assumes that the user has not moved back and forth between the countries (S304 NO). In this case, the modified example 1 proceeds to the process of S305. On the other hand, when the transmission source country included in the reception signal data matches the transmission source country immediately before the previous transmission source country included in the user data, the generation unit 213 assumes that the user has moved back and forth between the countries (S304 YES). Further, the generation unit 213 checks whether or not the user has moved back and forth between the countries within a predetermined period of time. The generation unit 213 calculates a difference between the signal reception time included in the user data and the reception time included in the reception signal data, and when a period of time obtained by adding the calculated time difference to the movement time included in the user data is within a predetermined period of time, the generation unit 213 assumes that the user has moved back and forth between the countries within a predetermined period of time. For example, the term "within a predetermined period of time" means within 24 hours. When the user has moved back and forth between the countries within a predetermined period of time, the generation unit 213 deletes the user data (S308). When the user has not moved back and forth between the countries within a predetermined period of time, the modified example 1 proceeds to the process of S305.

A spoofing attack by an attacker has occurred, an event occurs in which the UE 220 appears to be moved back and forth between countries within a period of time that it can be actually moved between the countries. Therefore, in the modified example 1, a user who has moved back and forth between the countries within a predetermined period of time is deleted from the user data. On the other hand, in the modified example 1, if a user has not moved back and forth between the countries within a predetermined period of time, it is not necessary to delete the user data of this user. Therefore, the number of training data pieces is increased, and the accuracy of a learning model used in the geographic impossibility detection method is further improved.

Note that the present invention is not limited to the above-described example embodiments and may be changed as appropriate without departing from the spirit of the present invention.

Each configuration in the above-described example embodiments may be implemented by software, hardware, or both of them, and may be implemented by one piece of hardware or software, or a plurality of pieces of hardware or software. The function (processing) of each apparatus may be implemented by a computer including a CPU, a memory, and the like. For example, programs for performing the methods according to the example embodiments are stored in a storage device, and each function may be implemented by causing the CPU to execute the programs stored in the storage device.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2020-063874, filed on Mar. 31, 2020, the disclosure of which is incorporated herein in its entirety by reference.

REFERENCE SIGNS LIST

110 LEARNING APPARATUS
111 COLLECTION UNIT (COLLECTION MEANS)
112 GENERATION UNIT (GENERATION MEANS)
113 LEARNING UNIT (LEARNING MEANS)
200 COMMUNICATION ENVIRONMENT
210 LEARNING APPARATUS
211 CONTROL UNIT
212 COLLECTION UNIT
213 GENERATION UNIT
214 LEARNING UNIT
216 STORAGE UNIT
220 UE
230 SPOOFING APPARATUS
240 MSC
250 HLR/HSS
260 HLR/HSS
270 MSC
280 UE
290 GW
310 DETERMINATION APPARATUS
311 COLLECTION UNIT
312 DETERMINATION UNIT
A USER
B ATTACKER
C USER
M1 SHORT MESSAGE
R1 REQUEST SIGNAL FOR UPDATING POSITION INFORMATION
R2 REQUEST SIGNAL FOR UPDATING POSITION INFORMATION

What is claimed is:

1. A determination system comprising:
a learning apparatus comprising:
   at least one memory storing instructions; and
   at least one processor configured to execute the instructions to:
     acquire, from a collection apparatus configured to collect requests for updating position information of user terminals, a plurality of reception signal data pieces including transmission source countries and reception times of the collected requests for updating the position information;
     generate, for each of the user terminals, user data including a movement history between two countries in one direction and a movement time between the two countries in the one direction based on the acquired plurality of reception signal data pieces; and
     learn a statistical value of the movement time between the two countries in the one direction based on the generated user data for each of the user terminals; and
a determination apparatus comprising:

at least one memory storing instructions; and
at least one processor configured to execute the instructions to:
determine, based on data regarding movement between countries generated by the learning apparatus, whether or not a user terminal is able to be moved between the countries;
collect reception signal data including a transmission source country where the user terminal has transmitted a request for updating position information and a reception time at which a relay apparatus has received the request for updating position information;
detect, based on the collected reception signal data, a country where the user terminal is located before it is moved and a country where the user terminal is located after it is moved, and a movement time of the user terminal between the countries; and
between the countries where the user terminal are moved, when the detected movement time of the user terminal between the countries is shorter by a predetermined time than the movement time between the countries included in the data regarding the movement between the countries, determine that the user terminal is not able to be moved between the countries.

2. The determination system according to claim 1, wherein the learning apparatus processor is configured to execute the instructions to:
collect first reception signal data, and second reception signal data that is received by the collection apparatus immediately after the first reception signal data is received thereby; and
when a first transmission source country included in the first reception signal data and a second transmission source country included in the second reception signal data are different from each other, set a difference between the reception times as the movement time of the user terminal from the first transmission source country to the second transmission source country.

3. The determination system according to claim 2, wherein the learning apparatus processor is configured to execute the instructions to:
further collect third reception signal data received by the collection apparatus immediately after the second reception signal data is received thereby; and
when the third reception signal data includes the first transmission source country, delete the user data of the user terminal.

4. The determination system according to claim 1, wherein the learning apparatus processor is configured to execute the instructions to, between predetermined countries, set, as the statistical value of the movement time between the two countries in the one direction, a minimum movement time between the countries among the user data pieces.

5. The determination system according to claim 1, wherein the learning apparatus processor is configured to execute the instructions to, when the user terminal has been moved back and forth between the countries within a predetermined period of time, delete the user data of the user terminal.

6. A determining apparatus comprising:
at least one memory storing instructions, and
at least one processor configured to execute the instructions to:
determine, based on a statistical value of the movement time between the two countries in the one direction, whether or not a user terminal is able to be moved between the countries, wherein the at least one processor further configured to execute the instructions to:
collect reception signal data including a transmission source country where the user terminal has transmitted a request for updating position information and a reception time at which a relay apparatus has received the request for updating position information;
detect, based on the collected reception signal data, a country where the user terminal is located before it is moved and a country where the user terminal is located after it is moved, and a movement time of the user terminal between the countries; and
between the countries where the user terminal are moved, when the detected movement time of the user terminal between the countries is shorter by a predetermined time than the statistical value of the movement time, determine that the user terminal is not able to be moved between the countries.

7. The determination apparatus according to claim 6, wherein
the statistical value of the movement time is learned by:
acquiring, from a collection apparatus configured to collect requests for updating position information of user terminals, a plurality of reception signal data pieces including transmission source countries and reception times of the collected requests for updating the position information,
generating, for each of the user terminals, user data including a movement history between two countries in one direction and a movement time between the two countries in the one direction based on the acquired plurality of reception signal data pieces, and
learning a statistical value of the movement time between the two countries in the one direction based on the generated user data for each of the user terminals.

8. The determination apparatus according to claim 7, wherein
the statistical value of the movement time is further learned by:
collecting first reception signal data, and second reception signal data that is received by the collection apparatus immediately after the first reception signal data is received thereby; and
when a first transmission source country included in the first reception signal data and a second transmission source country included in the second reception signal data are different from each other, setting a difference between the reception times as the movement time of the user terminal from the first transmission source country to the second transmission source country.

9. The determination apparatus according to claim 8, wherein
the statistical value of the movement time is further learned by:
collecting third reception signal data received by the collection apparatus immediately after the second reception signal data is received thereby; and
when the third reception signal data includes the first transmission source country, deleting the user data of the user terminal.

10. The determination apparatus according to claim 7, wherein
the statistical value of the movement time is further learned by, between predetermined countries, setting, as the statistical value of the movement time between the two countries in the one direction, a minimum movement time between the countries among the user data pieces.

11. The determination apparatus according to claim 7, wherein
the statistical value of the movement time is further learned by, when the user terminal has been moved back and forth between the countries within a predetermined period of time, deleting the user data of the user terminal.

12. A determining method comprising:
determining, based on a statistical value of the movement time between the two countries in the one direction, whether or not a user terminal is able to be moved between the countries;
collecting reception signal data including a transmission source country where the user terminal has transmitted a request for updating position information and a reception time at which a relay apparatus has received the request for updating position information;
detecting, based on the collected reception signal data, a country where the user terminal is located before it is moved and a country where the user terminal is located after it is moved, and a movement time of the user terminal between the countries; and
between the countries where the user terminal are moved, when the detected movement time of the user terminal between the countries is shorter by a predetermined time than the statistical value of the movement time, determining that the user terminal is not able to be moved between the countries.

* * * * *